United States Patent [19]
Zulian

[11] Patent Number: 5,941,967
[45] Date of Patent: Aug. 24, 1999

[54] UNIT FOR ARBITRATION OF ACCESS TO A BUS OF A MULTIPROCESSOR SYSTEM WITH MULTIPROCESSOR SYSTEM FOR ACCESS TO A PLURALITY OF SHARED RESOURCES, WITH TEMPORARY MASKING OF PSEUDO RANDOM DURATION OF ACCESS REQUESTS FOR THE EXECUTION OF ACCESS RETRY

[75] Inventor: Ferruccio Zulian, Milan, Italy

[73] Assignee: Bull HN Information Systems Italia S.p.A., Italy

[21] Appl. No.: 08/956,218

[22] Filed: Oct. 22, 1997

[30] Foreign Application Priority Data

Dec. 13, 1996 [EP] European Pat. Off. .............. 96830621

[51] Int. Cl.[6] ..................................................... G06F 13/36
[52] U.S. Cl. ........................... 710/107; 710/118; 710/240
[58] Field of Search .................................. 395/287, 285,
395/293, 728, 729, 298; 710/107, 105,
113, 240, 241, 118

[56] References Cited

U.S. PATENT DOCUMENTS 5,706,446  1/1998  Kalish et al. ............................ 395/293
5,774,679  6/1998  Kondo et al. ............................ 395/285
5,781,745  7/1998  Ramelson et al. ....................... 395/293

FOREIGN PATENT DOCUMENTS 665 501   8/1995   European Pat. Off. .
96 35175  11/1996  WIPO .

OTHER PUBLICATIONS

European Search Report for Application No. EP 96 83 0621.

*Primary Examiner*—Gopal C. Ray
*Attorney, Agent, or Firm*—Edward D. Manzo; Mark J. Murphy

[57] ABSTRACT

In a multiprocessor system with shared resources, which several processors access via a system bus by presenting bus access requests to an arbitration unit and receiving from the latter access grant signals and in which the busy state of a resource or a conflict of consistency determine the generation of a RETRY signal and compel the processor, which has obtained access to the bus, to execute an access RETRY attempt, consecutive repeated access RETRY attempts of the same processor activate logic of the arbitration unit which temporarily mask, for a varying duration, the access requests of the same processor for the execution of further consecutive RETRY attempts, the varying duration first increasing as a function of the number of further RETRY attempts and then varying in a random manner.

7 Claims, 6 Drawing Sheets

UNIT FOR ARBITRATION OF ACCESS TO A BUS OF A MULTIPROCESSOR SYSTEM WITH MULTIPROCESSOR SYSTEM FOR ACCESS TO A PLURALITY OF SHARED RESOURCES, WITH TEMPORARY MASKING OF PSEUDO RANDOM DURATION OF ACCESS REQUESTS FOR THE EXECUTION OF ACCESS RETRY

Unit for arbitration of access to a bus of a multiprocessor system for access to a plurality of shared resources, with temporary masking of pseudo random duration of access requests for the execution of access retry.

TECHNICAL FIELD

The present invention relates to a unit for arbitration of access to a bus of a multiprocessor system for access, via the bus, to a plurality of shared resources.

BACKGROUND OF THE INVENTION

In modern data processing systems, in order to achieve high performance, architectures are used with several processors interconnected together, with a plurality of shared resources, such as memory modules and data input/output control units (I/O control units), via a common multipoint communication channel referred to as the system bus, the latter constituting a shared resource.

Each unit (processor or input/output control unit) which requires access to another resource (a memory module, another processor, another I/O control unit) in order to receive or send information, first requires access to the system bus, thereby putting itself in competition with other units which also wish to obtain access to the system bus.

Conflicts of access to the system bus are resolved in a well-known manner by an arbitration unit, which in the case of competing requests for access to the system bus from several units, settles the conflict by granting access to a single competing unit at a time, according to a preset priority criteria (e.g. fixed priority, circular priority or round robin, etc.).

Having obtained access to the system bus, the requesting unit to which access was granted can place on the system bus the information required to identify the resource to which it needs access or the destination resource, generally an address, and the type of operation requested, for example reading/writing.

In the case of operations for writing to memory, this information is accompanied by the data item to be written.

For reasons which will be explained later, the resource required in order to execute the requested operation may be temporarily unavailable.

In this case, rather than keeping the system bus busy until the resource becomes free, it is preferred that a RETRY signal be sent to the requesting unit and thereby free the system bus so as to make it available for other transactions.

This signal can be generated by the busy resource, in response to the access request, or by the arbitration unit which acts as a collector of signals indicative of the state of the various resources, as a monitor of their state, and a dispatcher of a RETRY signal to the various requesting units.

Among the causes which may make a RETRY operation necessary are the following:

1. In order to minimize the time for which the system bus is busy, the operations of access to the various resources are set in an input buffer of the resource without waiting for their completion. In particular, it is known that read operations can be executed in two distinct bus busy phases, one for memory addressing and the other for retrieving the data item read.

Since, in general, the execution time for the requested operations (in particular memory read and write operations) is greater than the period between two successive arbitrations, it may happen that a second unit requests access to a resource while the latter is still engaged in executing a previous operation.

The presence of an input buffer only partly avoids this drawback (if the buffer is free the, requested operation can be set even if the resource is busy, however, if the buffer, which can also have several storage levels, is full, setting is impossible).

Hence, there is a conflict of access to the destination resource.

2. Again in order to minimize the time for which the system bus is busy and to improve performance, the processors are generally provided with a fast internal associative memory or cache, of limited capacity, which contains the information of more recent use (or of foreseeable immediate use by the processor) so as to entirely avoid access to the system bus and via the latter to the memory modules if the data requested by the processor are contained in the cache.

In this way, the same data can be contained in one or more caches and simultaneously in memory.

It is therefore necessary to ensure the coherence, or consistency, of the replicated data.

Each processor, via the system bus, must therefore be able to monitor the exchange of data between other units and the memory modules (via the addresses and commands present on the system bus) in order to ensure the consistency of the information contained in its cache with that of the information contained in the cache of the other processors and in memory.

Consistency is ensured by suitable protocols, for example the protocol known by the acronym MESI, via operations for monitoring known as "snooping" the system bus. As a result of and in response to which, the various caches dispatch to the others, over the system bus, response signals which make it possible to ensure the consistency of the data.

Included among these response signals is also a RETRY signal, required for example in many protocols, when a processor requests memory read of an information item which has been modified, is present in one or more caches and is not updated in memory.

In this case, the cache which "holds" the information item has to write the information item to memory, in its updated form, before the requesting processor executes a subsequent attempt to read the same from memory.

Several protocols provide for the direct intervention of the cache, which holds the data item instead of the memory, so that the request can be satisfied. However, in this case, conflicts of access to resources may still arise if the read access request is of the RMW type (read and modify followed in an uninterruptible manner by a write) and the operation of intervention by the cache requires in its turn the updating of memory, and hence the writing thereof.

Finally, if the caches are not provided with standalone snooping tables, the snoop operation can be made dependent on the fact that the cache is not engaged in the execution of other operations and is free.

In short, in multiprocessor systems, the execution of certain operations, with respect to which a unit has obtained access to the system bus, might not be immediately executable, whether through the unavailability of a destination resource required for execution of the operation, through the unavailability of other resources, even if these other resources do not participate directly and actively in the execution of the operation, or for reasons of consistency which make it essential to postpone it and have other operations precede it.

In these cases, execution of the operation has to be reattempted upon presentation of a new request for access to the system bus and a new arbitration.

A first inevitable consequence of this fact is that all the system bus access operations which do not conclude successfully, profitlessly eliminate the possibility of access to the system bus by other units, in the time interval in which the system bus is busy, lessening the availability of the bus and the performance of the other units.

A second consequence is that statistically in a probabilistic manner, direct requests for access to a single resource or indirectly requesting the collaboration of other resources for snooping operations, may accumulate over time, as a result of repeated RETRY attempts, thereby virtually creating a lockup condition. This is defined as "livelock" since, unlike the "deadlock" condition, the processors involved continue to repeat and reattempt the same operations in competition with one another, profitlessly in turn causing the system bus to be busy.

SUMMARY OF THE INVENTION

The present invention solves this problem and provides a multiprocessor system bus access arbitration unit in which, for each processor (and I/O unit) connected to the system bus, the access requests, consequent upon one signalling of at least a direct retry to the processor (in practice more than one and mutually consecutive), are temporarily masked (hence disregarded by the arbitration unit) for a variable interval of time, preferably increasing with the number of previous RETRY attempts consequent upon direct retry signallings to the processor, in such a way as to reduce the frequency of access and the probability of conflict in the access to the same resource.

Since the arbitration cycles follow one another with a predetermined period, in general equal to (or a multiple of) the period of a common clock signal, which times the operation of various units, the time interval for which the access requests are masked is expressed as a number of arbitration cycles.

For each processor, the masking time interval is a function solely of the number of previous consecutive RETRY attempts of the processor or, what is entirely equivalent, consecutive direct RETRY signallings to the same processor, not to the others, and which in general is therefore different from processor to processor.

For example for greater clarity, if a processor A is compelled to reattempt an access operation twice in succession, and hence has received two RETRY signallings, a subsequent and consecutive request for access to the system bus is masked for two arbitration cycles.

If the third access to the system bus also has to be repeated, the subsequent access request is masked for four arbitration cycles.

If the fourth access request also has to be repeated, the subsequent access request is masked for eight arbitration cycles.

Similarly, this occurs for other processors B, C, D, etc., each independently of the others.

In this way, for each processor, the retry attempts are staggered over time to an ever greater extent, and in a manner which is generally different from processor to processor and is pseudo random, so as to minimize the risk of potential direct conflict of access to the same resource or of indirect conflict, through the unavailability of indirectly involved resources (caches) or through conflict of consistency.

In order to further minimize the risk of conflicts and increase the pseudo randomless of the masking times, a further mechanism can be introduced which imposes a masking time dependent on the state of a cyclic counter (or more generally a generator of pseudo random numbers) which evolves at each arbitration cycle.

According to a further aspect of the present invention, the mechanism for the temporary masking of the arbitration unit is activated, for each processor, after a different number of retry signallings and consequently RETRY attempts, depending on the nature of the event which prompted the signalling and the retry attempt.

Thus, if the retry attempts are due to the signalling of a busy state of the destination resource, masking can be activated after a first predetermined number of retry signallings (and attempts) and can have a duration which increases according to a first criterion.

If, on the other hand, the retry attempts are due to conflicts of consistency which first have to be resolved, the temporary masking mechanism can be activated after a smaller number of retry signallings (and attempts) than previously described and can have a duration which increases with the same first criterion or with a different criterion.

BRIEF DESCRIPTION OF THE DRAWINGS

The characteristics and advantages of the present invention will emerge more clearly from the description which follows of a preferred embodiment, given with reference to the appended drawings in which.

DETAILED DESCRIPTION OF THE PREFERRED EMBODIMENT

Figure 1:
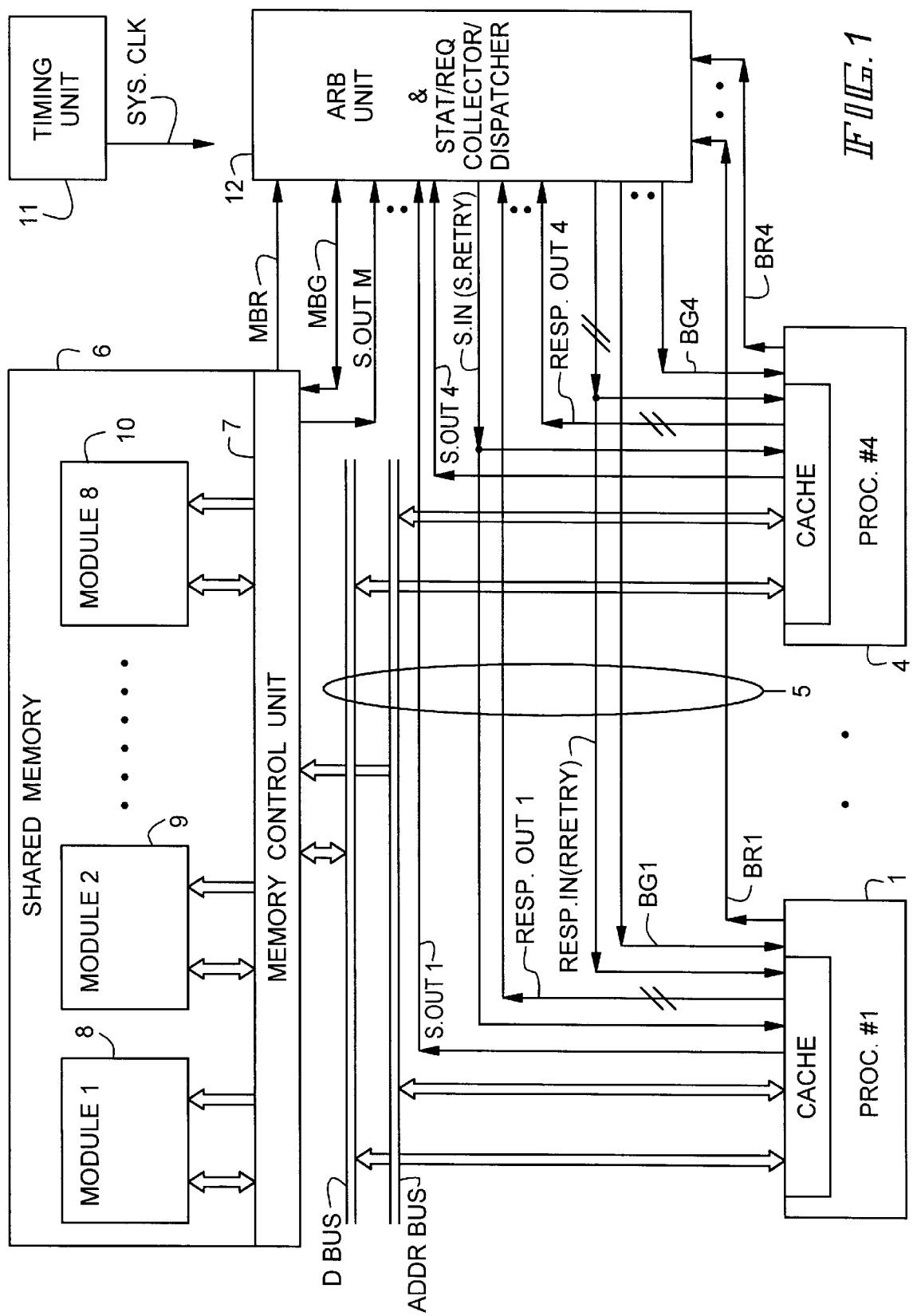
FIG. 1 is a block diagram of a multiprocessor system with shared resources which uses an arbitration unit in accordance with the present invention.

FIG. 1 represents a block diagram of the architecture of a multiprocessor system, in itself conventional, comprising an arbitration unit in accordance with the present invention.

The system comprises a plurality of processors 1, . . . 4, for example four in number, interconnected via a system bus 5, with a shared memory 6, made up of a memory control unit 7 and a plurality of memory modules 8, 9, 10, for example eight in number.

Each processor, which can also be a processor for controlling input/output units, comprises an internal cache.

The operation of the system is timed by a timing unit 11 which generates a periodic clock signal CLK, dispatched to all the units of the system.

The system bus comprises a multipoint channel DBUS or transferring data, a multipoint channel ADDRBUS for transferring addresses and commands, and a plurality of point-to-point connection wires between each of the processors and an arbitration unit 12.

In particular, the various processors each send a request for access to the system bus, BR1, . . . BR4, to the arbitration unit 12, by means of a dedicated wire.

The arbitration unit responds to the various processors (only one each time) sending, on a dedicated wire, a bus grant signal BG1 . . . BG4.

In the case, represented, in which the operation of the system is synchronous, and in which the time intervals for which the bus is busy have a predetermined duration, a third signal (BUS BUSY) defining the free/busy state of the system bus, generally provided in asynchronous systems, is not necessary.

If, as represented, the memory control unit 7 is a different unit from the arbitration unit 12, and the technique known as "split bus cycle" is used for reading the data in memory, the memory control unit 7 sends to the arbitration unit 12, a bus access request MBR (which preferably has maximum priority) when it requires to reconnect to the system bus. The arbitration unit responds with an access granted signal MBG.

However, in a synchronous system, it is possible to construct an arbitration unit which operates also as a memory control unit and which as a function of the activities requested of memory can foresee precisely how they develop over time and the necessity for reconnection to the system bus, which is scheduled automatically.

In this case, since the memory control unit is integrated into the arbitration unit, the signals MBR and MBG are superfluous.

The various processors 1, . . . 4 send, over dedicated wires, a state signal S.OUT1, . . . ,S.OUT4 to the arbitration unit 12 in response to the recognition, on the system bus, of an address which identifies them as destinations of a message.

Depending on its 0/1 logic level, this signal informs the arbitration unit 12 of the availability of the processor to receive the message and operate accordingly.

The memory control unit 7 also sends over a dedicated wire, a state signal S.OUTM to the arbitration unit 12 in response to the recognition on the system bus of an address which identifies a memory module as a destination of a read/write command.

Depending on its 0/1 logic level, this signal informs the arbitration unit of the availability of the addressed memory module to execute the requested operation.

It should be made clear at this point that the shared memory 6, comprising several modules, can be suitably structured as an interleaved memory in which the various modules operate with memory cycles which partially overlap in time.

The arbitration unit 12 operates as a collector of the signals S.OUT1 . . . 4, S.OUTM. It also dispatches to all the processors, via a multipoint connection wire, a state signal S.IN, which is essentially the OR of all the signals S.OUTi, and informs the requesting processor of the availability of the resource or resources required for the execution of the requested operation.

If these are not available (S.IN=1), the signal S.IN has the meaning of a RETRY signal.

Since the state signal S.IN is received by all the processors, each processor has internal phasing logic which, as a function of the relative timing between the granting of access BGi and the RETRY signalling, allows it to be recognized as the destination of the signal.

Clearly the memory control unit 7 does not need to receive this signal as its reconnection to the system bus implies that there be a processor waiting to receive the information item read from memory.

To guarantee the consistency of the data, in memory or in the various processor caches, the various processors use a plurality of dedicated wires (two or more) to forward a binary response code RESP OUT1, . . . RESP OUT4 to the arbitration unit 12, as the outcome of the snooping operation executed.

A particular configuration of this binary code is indicative of the need for a RETRY.

Other configurations, such as an indicative of a data item not present in the cache, (NULL), present and shared (SHARED), present and held in modified form (MODIFIED) are used by the various processors to update, according to the consistency protocol employed, the state of the data in the respective cache memories.

For this purpose, the arbitration unit 12, which acts as the collector of these codes, decodes them and dispatches to the processors, over a pair of multipoint connection wires, a response code RESP.IN, with the meaning RETRY, NULL, SHARED, MODIFIED, as the case may be.

Figure 2:
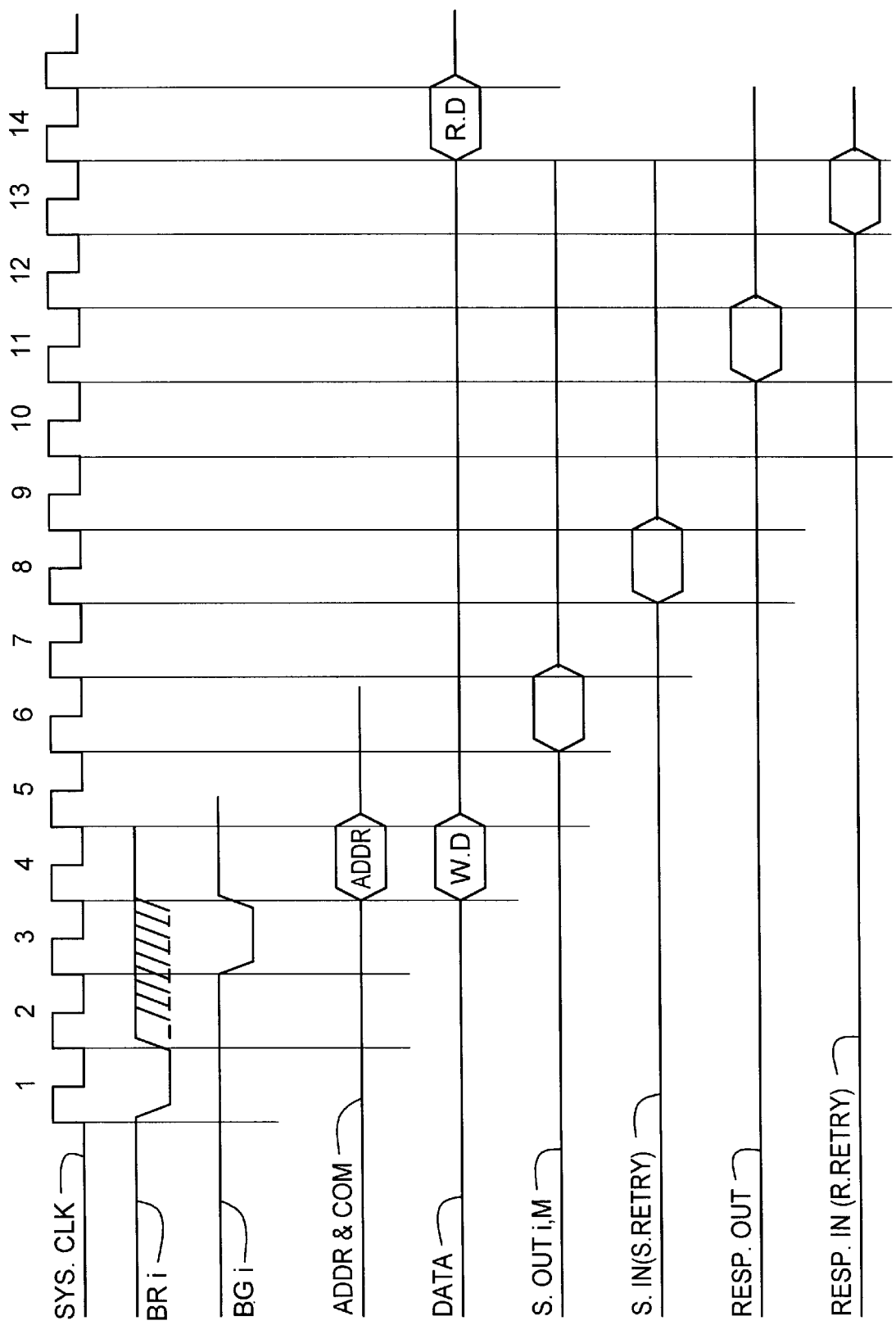
FIG. 2 is a time chart which illustrates the exchange of signals which occurs on the bus of the system of FIG. 1 through access to the bus and, via the bus, to a shared resource.

FIG. 2 represents a time chart of the exchange of messages which takes place on the system bus between a requesting processor, the arbitration unit and the other units in the system of FIG. 1.

The chart SYS CLK represents the periodic clock signal, which times the various units of the system, and defines successively ordered clock periods, 1,2,3,4 . . . with a period greater than the propagation time of the signals along the system bus and between the various units connected thereto.

The chart BRi represents the electrical level of the access request signal of the generic processor "i" which is asserted (logically 1 or true) when the electrical level is 0.

The chart BGi represents the access grant signal generated by the arbitration unit and sent in response to the generic processor "i".

The chart ADDR&COM represents the address and command signals placed on the system bus.

The chart DATA represents the data placed on the system bus by processor "i" in the case of a write operation (W.D) and by the memory control unit (R.D) in the case of read operations.

The chart SOUTi,M represents the state signal placed on the system bus by the destination unit (generic processor "i" or memory control unit) and possibly other units, if these are also involved, in response to the address and the commands present on the system bus.

The chart S.IN represents the signal dispatched by the arbitration unit and generated as a function of the signals SOUT received.

The chart RESP.OUT represents the response code placed on the system bus by each of the various processors, as a consequence of the snooping operation executed.

The chart RESP.IN represents the response code dispatched by the arbitration unit and generated as a function of the ensuing RESP.OUT received.

At the start of period 1, defined by the rising edge of the signal SYS.CLK, processor "i" asserts the access request signal BRi.

The signal propagates along the system bus and is stored, together with other possible access requests asserted by other units, in an input register of the arbitration unit 12.

In the course of period 2, arbitration logic of the arbitration unit 12 executes the arbitration between competing access requests.

The outcome of the arbitration results in a signal BGi asserted, stored in an output register at the start of period 3 and placed on the system bus in response to the requesting unit which wins the arbitration.

In the course of period 3, the signal BGi propagates over the bus and is definitely received by the requesting unit, at the start of period 4. Whereupon, the unit, which has obtained access to the system bus, can place on the bus (1) an address (of a memory or of some other unit), (2) commands which define the requested operation and, (3) if the latter is memory write, the data to be written. This information is removed from the bus at the start of the following period 5.

With the start of period 5, the information is definitely available to the other units connected to the bus, which can store it in an input register, execute the necessary checks of availability and execute the requested operation, if they are involved, so as to output at the start of period 6 the state signal SOUTi which is logically deasserted (hence at the positive electrical level) to indicate the busy state of the resource and the need to reattempt the access operation.

These signals are definitely available as input to the arbitration unit at the start of period 7, so as to be loaded into an input register, placed in a logical OR and dispatched, via an output register (flip/flop) to the various processors as a signal SIN which, when logically deasserted, has the meaning S.RETRY necessitated by a busy state of the resources.

Meanwhile, with the start of period 5, the cache of the various processors can trigger the necessary snooping operation. In the example presented, this requires 6 periods of the clock signal in order to be completed (although in general it can be programmable as a function of requirements).

Thus, at the start of period 11, the various processors can each put onto the respective wires of the bus, the code RESP.OUT consequent upon the snooping executed.

These codes, definitely available as input to the arbitration unit 12 at the start of period 12, can be loaded into an input register and decoded so as to output, at the start of the period 13, an output code RESP.IN dispatched to all the processors.

If even a single of the codes received by the arbitration unit is indicative of a need for a retry, the code RESP.IN has the meaning of a retry signal and is indicated as R.RETRY so as to distinguish it from the state retry signal S.RETRY.

Finally, if the operation requested is a read operation, successfully concluded, the memory control unit (in this case after having requested and obtained access to the bus) can place the requested information item on the data channel, for example in period 14.

In a synchronous communication system, like that described, the various phases of the communication protocol are correlated one-to-one, and it is potentially possible to execute an arbitration and an access to the system bus at each period of the clock signal, without needing to correlate the various signals which are generated at various instants by marking or "TAG" codes.

In practice, to avoid conflicts, even if temporary, between the various driver circuits (of the tristate type) of the same multipoint bus wire, it is expedient to execute the operations of arbitration and occupation of the bus every two or more periods of the clock signal, so as to sharply separate the phases in which the drivers are in action.

In this case, the access request signals BRi have to be enabled for a duration at least equal to the arbitration period.

For example in a known manner, with a communication protocol known as "hand shaking", the disabling of the generic request BRi can be determined by receiving the corresponding enabled signal BGi.

The foregoing description relates to known aspects of the system architecture: the execution of RETRY operations is inevitable if it is desired to avoid prolonged occupations of the system bus while waiting for the necessary resources to be available or deadlock situations determined by conflicts of consistency.

Nevertheless, as already stated, the RETRY operations also include wastage of resources, and are potential causes of lockup situations or livelock which need to be avoided.

Figure 3:
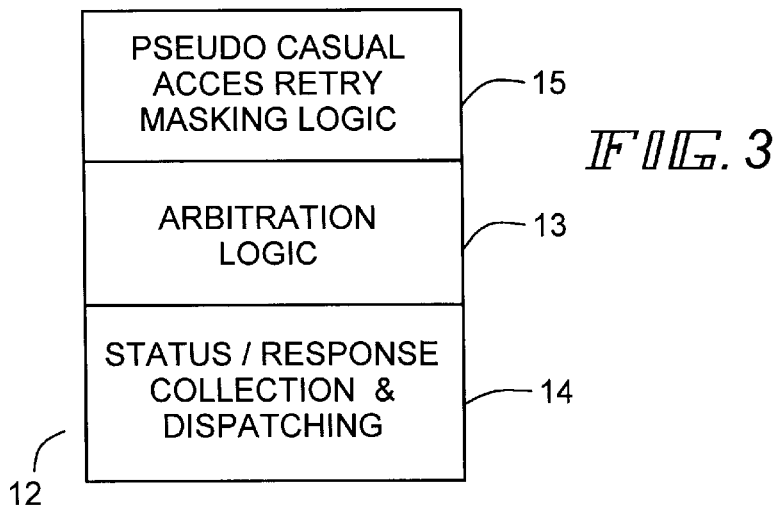
FIG. 3 is a block diagram summarizing the arbitration unit of the system of FIG. 1, embodied in accordance with the present invention.

For this purpose, as represented schematically in FIG. 3, the arbitration unit 12 comprises, in addition to conventional arbitration logic 13 (ARB.LOGIC) and conventional logic for collecting and dispatching the state and request signals 14 (STAT/REQ COLLECTOR/DESPATCHER), pseudo random RETRY attempts masking logic 15 wherein the present invention lies.

Figure 4:
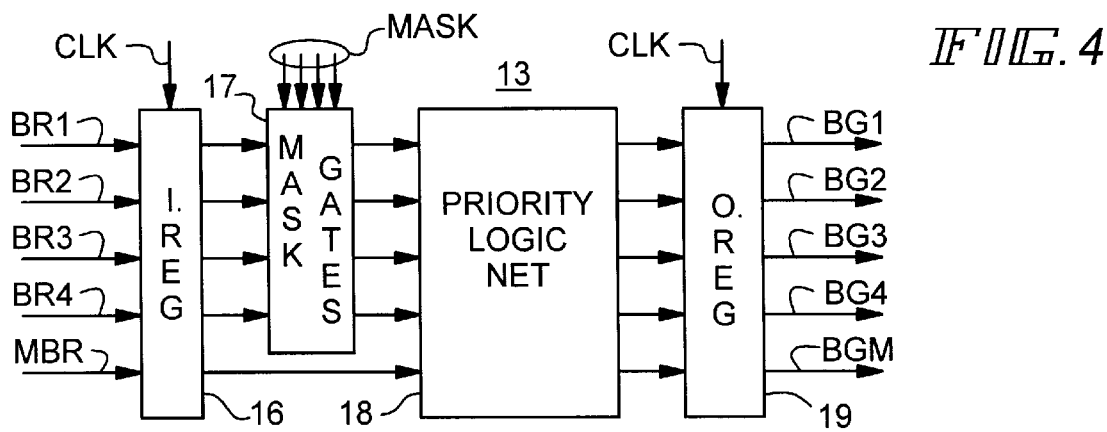
FIG. 4 is a block diagram of the arbitration logic of the arbitration unit of FIG. 3.

FIG. 4 represents the conventional structure of arbitration logic 13 for the system of FIG. 1.

The access requests BR1, . . . BR4, MBR, are fed into an input register IREG 16, timed by a clock signal CLK (which can be the same signal SYS CLK or a signal having a period which is a multiple of that of SYS CLK).

The outputs of the register 16 are connected as inputs to a set of masking gates 17 controlled by a mask code MASK.

The outputs of the gates 17 are connected to the inputs of a priority logic network 18 (PRIOR. LOGIC NET.) the structure of which depends on the priority criteria adopted (fixed, round robin etc.), with MBR always having the maximum priority.

The outputs of the logic network 18 are connected to the inputs of an output register O-REG 19, timed by the clock signal CLK.

The signals BG1, . . . BG4, BGM are available at the output of the register 19 and are sent to the respective processors (and memory control unit) and to the pseudo random masking logic.

Figure 5:
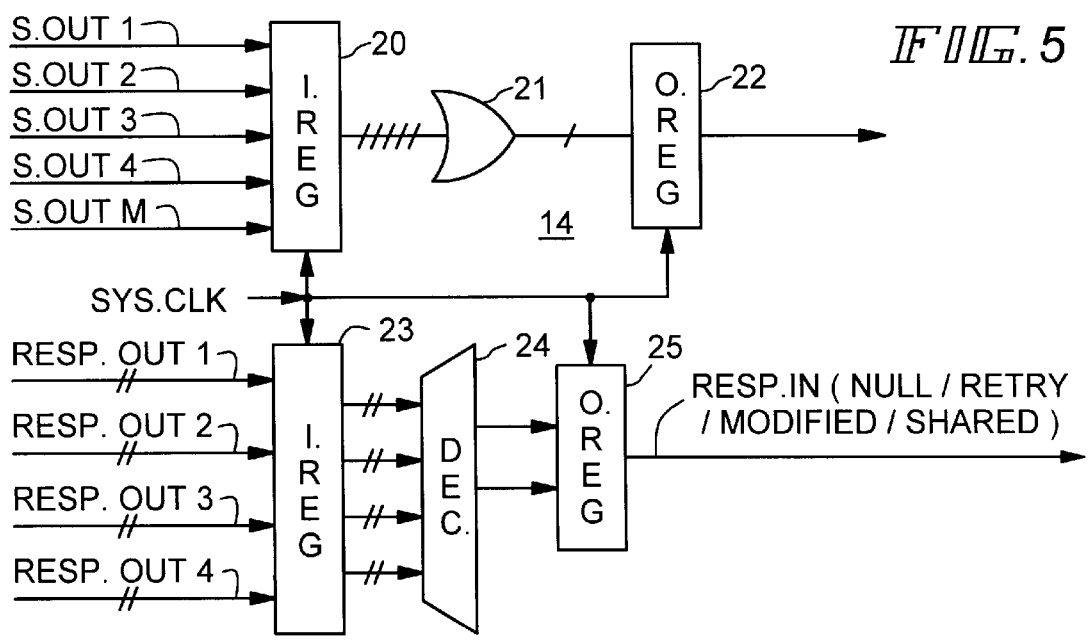
FIG. 5 is a block diagram of the logic for collecting and redispatching state and response signals (following snooping operations) of the arbitration unit of FIG. 3.

FIG. 5 represents the conventional structure of the logic for collecting and dispatching the state and response signals 14.

The state signals SOUT(1, . . . 4), SOUT,M are fed into an input register I.REG 20, timed by the clock signal SYS CLK.

The outputs from the register 20 are fed into an OR gate 21, the output of which is connected to the input of a register (O.REG) 22 timed by the signal SYS CLK.

Available at the output of the register 22 is the signal S.IN, with the meaning state RETRY, if logically disabled, which is dispatched to all the processors, via the system bus and to the pseudo random masking logic.

In substantially similar manner, the response codes RESP OUT(1 . . . 4) generated by the various processors are fed into an input register I.REG 23, timed by the clock signal SYS CLK.

The outputs of the register are connected to the inputs of a decoder 24 which outputs a code, with the meaning response RETRY signal, if even only one of the input codes has this meaning.

The code output is fed into an output register O.REG 25, timed by the clock signal SYS CLK, and is dispatched by this register to all the processors, via the system bus, as well as to the pseudo casual masking logic.

Figure 6:
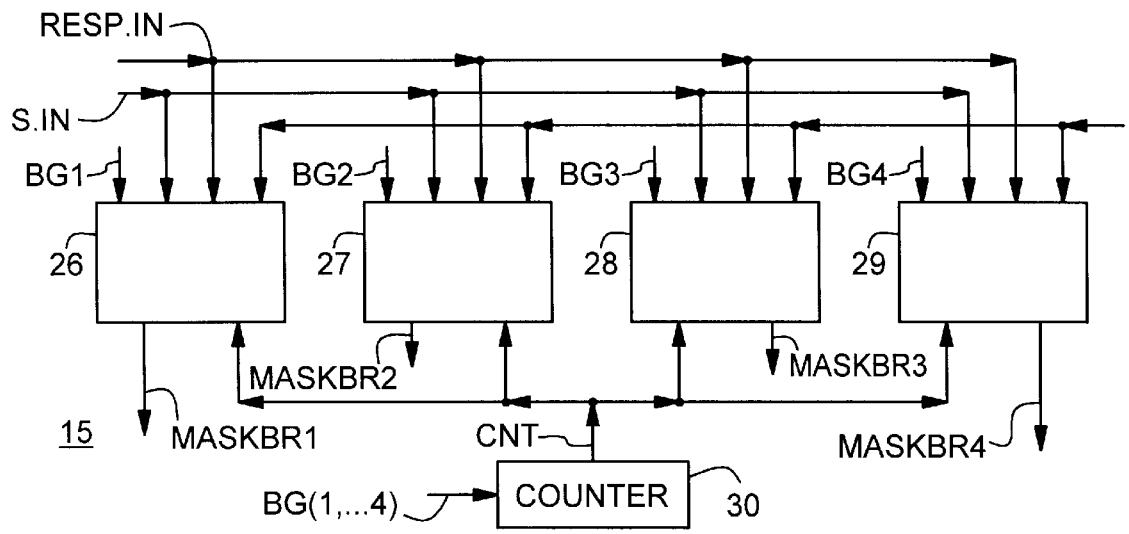
FIG. 6 is a summary block diagram of the logic for masking access reattempts of the arbitration unit of FIG. 3.

FIG. 6 represents a block logic diagram of a preferred embodiment of pseudo random masking logic 15 for the access reattempts in accordance with the present invention.

The masking logic essentially comprises a plurality of masking logic units 26, 27, 28, 29, equal in number to that of the processors 1, . . . 4 and, preferably but not necessarily, a cyclic counter 30, with variable incrementation controlled by the ORing of the signals BGi applied as an input (or even by the periodic clock signal SYS CLK) which cyclically takes increasing values, for example 1, 2, 4, 8, 16, 32.

The logic units 26, 27, 28, 29 each respectively receive the signals BG1, . . . BG4 and collectively the signal S.IN, the code RESP.IN (or in substantially equivalent manner a signal decoded from RESP.IN with the meaning RETRY) and the clock signal SYS CLK.

They also receive, from the counter 30, if present, the count value CNT of the counter.

The masking logic units respectively output a mask signal MASK1, . . . MASK4, enabled for a duration, the latter expressed as a number of periods of the clock signal CLK, varying as a function of the machine state, independently for each machine.

Figure 7:
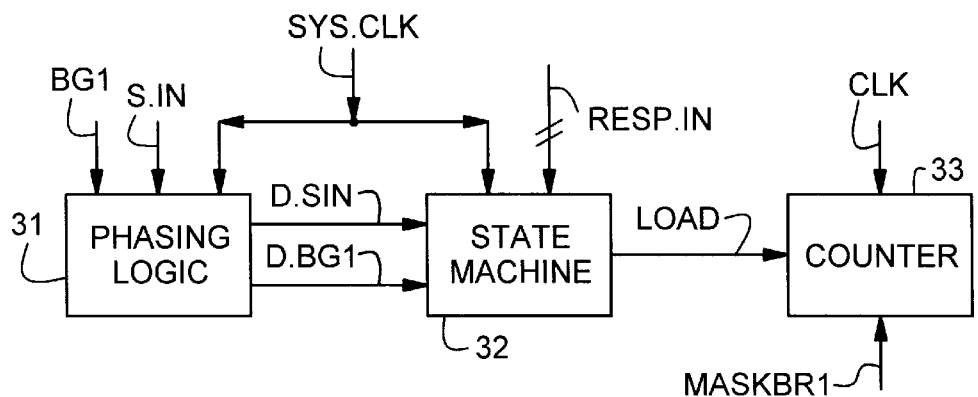
FIG. 7 is a more detailed block diagram of one of the blocks of the masking logic of FIG. 6 comprising phasing logic, a state machine and a counter.

Since the various masking logic units are structurally identical to one another, FIG. 7 represents a block diagram of a preferred embodiment of just one of them, in particular the logic unit 26 associated with the processor 1 (FIG. 1).

Conceptually, the logic unit 26 comprises phasing logic 31, a state machine 32 and a counter 33.

The phasing logic 31, essentially a pair of shift registers controlled by the clock signal SYS CLK, receives the signal BG1 and the signal SIN as inputs and produces two mutually synchronous signals D.BG1 and D.SIN as output. These are delayed in time and applied as inputs to the state machine 32.

The two signals D.BG1 and D.SIN are also synchronous with the response code RESP.IN consequent on BG1, so that the signals SIN, RESP.IN are correlated with the processor 1 to which access to the bus was granted, and thereby is a consequence.

Thus, if S.IN and RESP.IN have the meaning RETRY, they are correlated with the processor having to execute the retry operation.

The state machine 32 receives as inputs, in addition to the signals D.BG1 and D.SIN, the code RESP.IN and the clock signal SYS CLK and evolves as a function of these.

Figure 8:
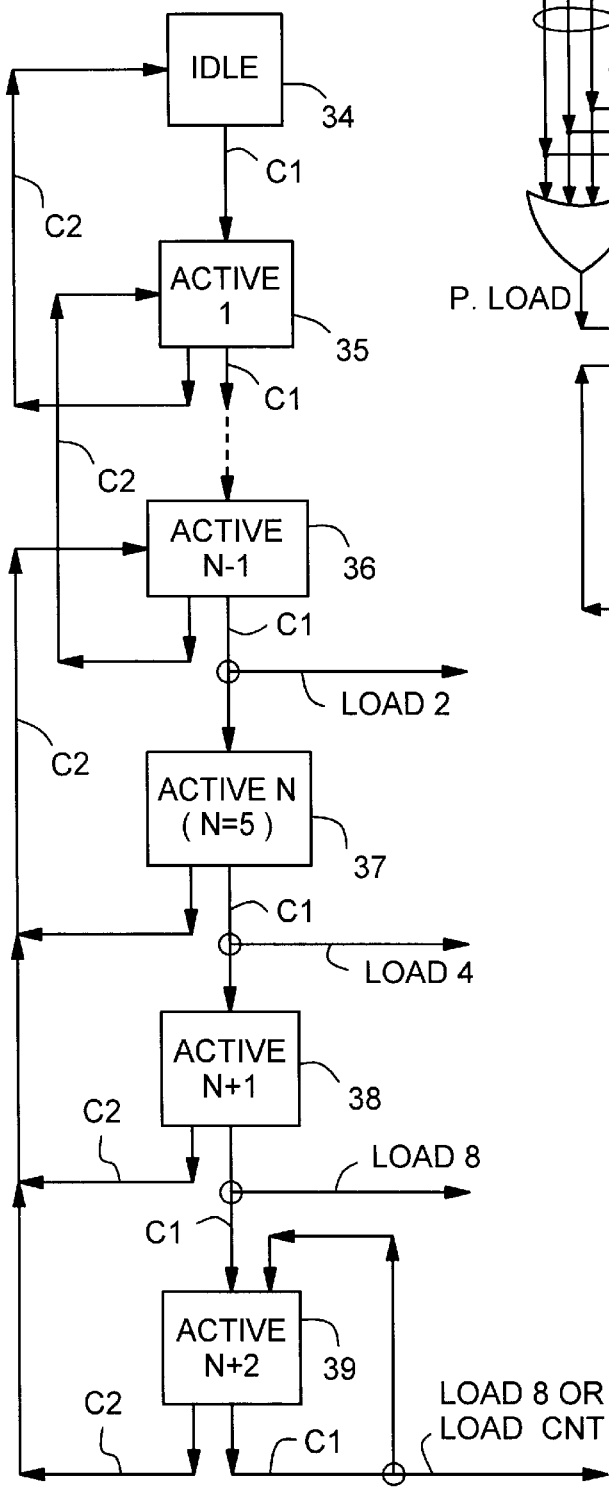
FIG. 8 is a state chart for the state machine of FIG. 7, for a first embodiment of an arbitration unit in accordance with the present invention.

FIG. 8 represents a state chart of the operation of the machine 32 which, after having defined the operative modes, can be constructed in circuit form in many ways, including automatically, with the aid of suitable programs for designing and simulating logic networks.

The machine passes from an inactive state (IDLE) 34 to a first active state (ACTIVE 1) 35 upon satisfaction of the condition C1=D.BG1*(DSRETRY+RRETRY)

This occurs if the signal D.SIN=DSRETRY has the meaning RETRY or RESP.IN=RRETRY has the meaning RETRY and jointly D.BG1 is enabled (in other words if the processor 1 is required to execute a first RETRY attempt).

The machine passes from the first active state 35 successively into a second, third, N-1th active state always upon satisfaction of the condition C1, i.e. on recognition of N-1 successive RETRY signals destined for the processor 1 and following the previous one (in other words, if the processor 1 is compelled to execute 2,3, . . .,N-1 RETRY attempts consecutively).

By consecutive RETRY signals, what is meant is correlated RETRY signals, destined for the same processor, which are not interspersed with state and response signals, destined for the same processor, which have a meaning (NULL, SHARED, MODIFIED) which differs from that of RETRY.

If, however, the condition

C2=D.BG1*(N/DSRETRY*N/RRETRY*N/SYSCLK)

is satisfied, where N/ represents the inversion symbol and the clock signal N/SYSCLK ensures that the condition C2 is satisfied when the other signals have a stable state, the state machine passes from the first active state 35 to the inactive state 34 and from the active states following the first to a previous state, which may be the inactive one or an intermediate active state.

For example, FIG. 8 shows a return from the active state 36 (ACTIVE N-1) to the first active state upon satisfaction of the condition C2, i.e. if the RETRY attempt is the last in the series of consecutive attempts.

On the other hand, from the state 36, the machine passes to an active state 37 (ACTIVE N) upon satisfaction of an nth consecutive RETRY signalling related to the same processor, i.e. upon satisfaction of the condition C1 in the execution of the N-th RETRY attempt.

In the course of this transition, the machine generates a signal LOAD2, the function of which is to load the counter 33 (FIG. 7) with a count value equal to 2 and permit decrementation of the counter, normally inactive, with each successive pulse received from the periodic signal CLK (or SYSCLK).

As will be seen hereafter, the counter 33, for each state representative of a count value different from zero, enables a signal MASK1 which when applied as an input to the arbitration logic (mask gates 17 of FIG. 4) masks the signal BR1 and prevents the arbitration network from considering this signal, even if enabled.

Thus after N (where for example N=5) RETRY signals destined for the processor 1 and the corresponding execution of N RETRY attempts, a following access request is masked by two arbitration periods, with the expectation that after this time interval the execution of an N+1th RETRY may be performed successfully.

If this operation also fails and the condition C1 is satisfied once again, the state machine passes from the state 37 to the active state 38 (ACTIVE N+1).

In the course of this transition, the machine generates a signal LOAD4 which loads the counter 33 with a count value equal to 4, so that a following access request BG1 of the processor 1 for an n+2th RETRY attempt is masked for an even greater duration.

If this provision is also unsuccessful and the condition C1 is again satisfied, the machine passes from the state 38 to the active state 39 (ACTIVE N+2).

In the course of this transition, the machine generates a signal LOAD 8 which loads the counter 33 with a count value equal to 8 so that a following access request of the processor 1 for the RETRY operation is masked for an even greater duration.

Further successive states can also be provided for, at will, up to a state ACTIVE N+K.

In the state 39 (ACTIVE N+2 or ACTIVE N+K if K>2), each successive recognition of a RETRY signal (condition C1 satisfied) can cause the loading of the counter 33 with the same numerical value (8 or more).

However, in order to dispatch in a manner, which is even more random in time then the successive access requests consequent on a retry signalling, a cyclic counter 30 (FIG. 6) is provided which delivers a time-varying binary value.

Thus, the command issued upon each condition C1 satisfied, with the machine in state 39, is expediently equal to LOAD CNT where CNT is the count value of the counter 30 at any moment.

The value CNT is loaded into the counter 33 which thus masks a following access request to the processor 1, for a number of arbitration periods equal to CNT.

The machine returns from the states 37, 38, 39 to a previous state preferably different from the inactive one, and for example the state 36, on satisfaction of the condition C2.

In other words, the machine "remembers" that the last access granted to the processor 1 was immediately preceded by time-masked retry attempts and before resuming its inactive state, checks that the retry access follows, on the part of the same machine, at least one other access which is successfully completed, i.e. does not give rise to a retry signalling.

Figure 9:
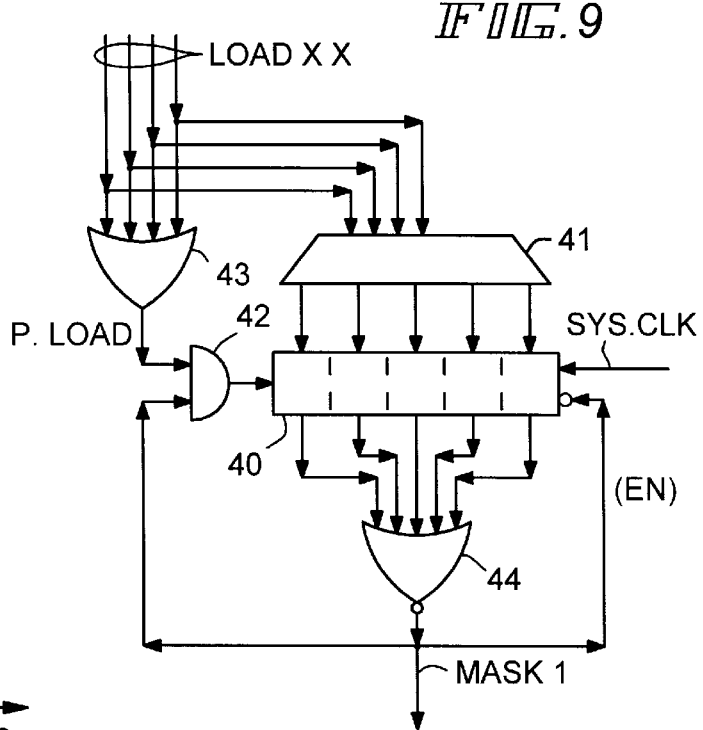
FIG. 9 is a circuit diagram exemplifying the embodiment of the counter of FIG. 7.

As represented in FIG. 9, the counter 33 can comprise a binary counter 40 with 5 cells, with clock input CK, which receives the signal SYSCLK as a decrementation command, parallel-preset inputs connected to the outputs of a decoder 41, which in turn receives the various signals LOADxx (xx=2,4,8,CNT) from the state machine 32, and parallel loading command input P.LOAD which receives via an AND gate 42, the OR (OR gate 43) of the signals LOADxx.

The outputs from the counter are applied as inputs to an NOR gate 44 having at its output the signal MASK1 at enabled logic level (electric 0) for all the counter states representative of a value different from 0.

This signal is sent to the mask gate of the mask gates 17 which conditions the transfer of the enabled signal BR1 to the arbitration network (FIG. 4); logically disabled, it is used as a condition to permit parallel preset of the counter and, applied to an input EN, to bar decrementation of the counter 44, once the 0 count state is reached.

From a circuit point of view, the state machine 32 can be constructed similarly, suitably combining a counter with decoders for the output and for the preset configurations.

Thus, an arbitration unit is constructed which allows the masking with a pseudo random duration of access reattempts by the various processors, which increases with the number of attempts previously executed.

The unit is extremely flexible and versatile and can be adapted to specific requirements, since various parameters may be chosen freely:

it is possible to choose at will the number N of consecutive RETRY signallings (and consequently of RETRY attempts prompted by them), directed to the same processor, after which the masking mechanism intervenes, as well as the number K of further consecutive RETRY signallings (and attempts) as a function of which to vary the duration of the masking time;

it is possible to choose, preferably increasing, the variable duration of the masking time, expressed as a number of arbitration or system clock periods, as well as the duration of the masking time determined by the intervention of the counter 30 or, instead of the latter, by a more sophisticated generator of random numbers which is made to evolve by the clock signal SYS CLK;

it is possible to choose at will the criterion with which to vary and preferably increase the duration of the masking time, as a function of the number of previous retry signallings (according to an exponential criterion to the base two as exemplified, of multiplication by a fixed or variable factor or the like); and the "memory persistence", i.e. return route of the state machine to the inactive state, can be chosen within wide limits.

Furthermore, since in general in multiprocessor systems it is possible to distinguish, on the basis of the signals S.IN, RESP.IN, between retry attempts due to unavailability of the resources and retry attempts due to conflicts recognized through snooping, the variable masking times can be adapted to the two different circumstances.

Figure 10:
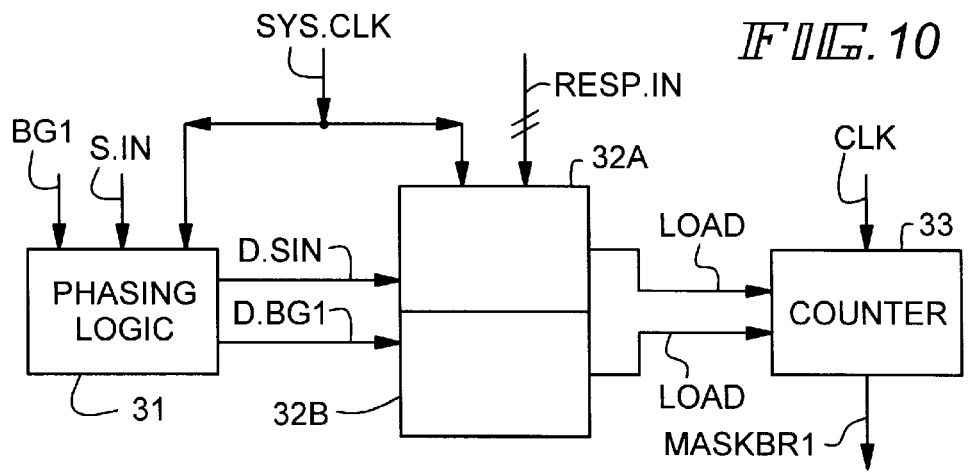
FIG. 10 is a block diagram of a preferred embodiment of the blocks of the masking logic of FIG. 6, each block comprising two state machines.

FIG. 10 schematically represents a masking logic unit which operates selectively as a function of the various types of retry signals which activate it.

The logic unit, as in the example of FIG. 7, comprises phasing logic 31, a counter 33 and a state machine which, unlike that of FIG. 7, consists of two distinct sections 32A and 32B.

The section 32A can for example operate as shown in the state chart of FIG. 8 and evolve as a result of the conditions C1 and C2, i.e. as a result of consecutive retry attempts, whatever the cause thereof.

Figure 11:
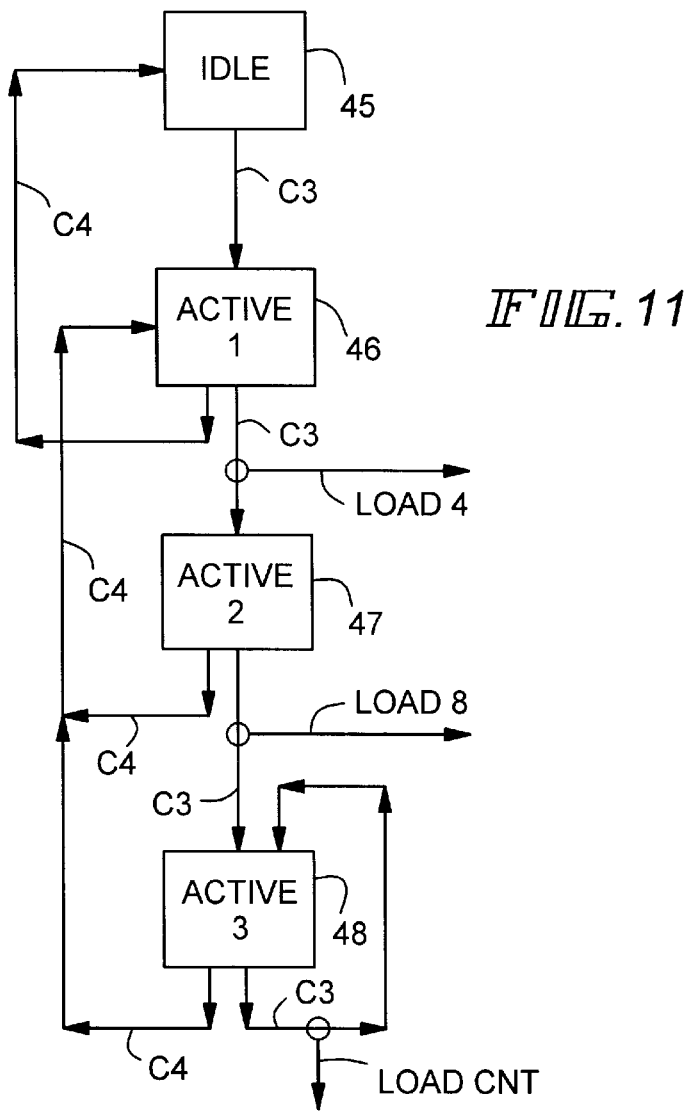
FIG. 11 is a state chart for one of the state machines of FIG. 10.

Unlike the section 32A, the section 32B can evolve as a result merely of the RETRYs requested with the code RESP.IN (and consequent snooping operations) and in a different manner from that of the section 32A and represented for example by the state chart of FIG. 11, i.e. as a result of consecutive retry signallings determined exclusively by a conflict of consistency.

By consecutive, it is meant in this case retry signallings determined by a conflict of consistency (R.RETRY) which are correlated with the same processor and are not interspersed with other response signallings, correlated with the same processor in which the RESP.IN code has a different meaning from that of R.RETRY, i.e. the signal R.RETRY is negated.

The section 32B passes from the inactive state 45 to the state 46 upon the condition C3=D.BGL*RRETRY being satisfied, and then to the state 47 upon the same condition being satisfied again.

In the course of the transition from the state 46 to the state 47, a signal LOAD4 is generated which when sent to the counter 33 prompts the enabling of the mask signal for a duration of four arbitration periods.

Likewise, in passing from the state 47 to a state 48 determined by the condition C3 being again satisfied, the signal LOAD8 is sent to the counter 33 and then, with the subsequent recognition of the condition C3, in the state 48, the signal LOAD CNT.

There is a return from the state 46 to the inactive state when the following condition is satisfied,

C4=SYSCLK*D.BG1*N/RRETRY

The same condition determines the passage from state 47 or 48 to state 46.

The foregoing description relates merely to a preferred embodiment, presented by way of a non-limiting example.

It is, however, obvious that many variants may be made thereto.

For example, the arbitration unit can also fulfil the role a memory control unit and receive addresses and commands from the system bus, on the basis of which it can select the requested module, if available, or generate the resource busy signal S.IN, if already busy.

It is also possible to schedule the reconnection of the memory to the system bus, in the case of read operations and to take account of this non-postponable necessity when executing access arbitrations.

It is thus obvious that the various masking logic units such as 26, 27, 28, 29 of FIG. 6, rather than "concentrated" in the arbitration unit (preferably in a single integrated circuit), can be decentralized and integrated, each one in a respective processor.

In this case, the masking of the access resources BRi is executed upstream of the system bus.

Also, the counter 33, rather than being placed beforehand in a configuration which represents the number of arbitration periods over which the mask signal is enabled, and then decremented, can be placed beforehand in a configuration whose complement to the capacity of the counter represents the duration of the mask signal and then incremented.

The multiprocessor system, rather than being of the synchronous type, can be of the asynchronous type: in this case, to avoid confusion between signals which present themselves at different instants, "TAGs" must be associated with the state and response signals, which "TAGS" make it possible to identify the access to the system bus to which they refer and thus to correlate the signals with the processor which requested the access, an operation equivalent to phasing.

The temporary masking of access requests can then be executed with the abovementioned criteria of duration varying as a function of the number of RETRY signallings and based on a periodic clock signal which can also not have any relationship to the arbitration cycle.

However complex, the temporary masking is feasible in this case also.

It is thus obvious that, for the sake of simplification, if no intervention is requested which differs as a function of the type of event (resource busy, conflict of consistency) which prompts the retry operations, it suffices to employ a single retry signal in the communication protocol.

What is claimed is:

1. Unit for arbitration of access to a bus of a multiprocessor system, for access, via said bus, to shared system resources, in which system each processor of a plurality of processors, in order to access a shared resource, presents an access request BRi to said arbitration unit and receives from said arbitration unit an access grant signal BGi to said system bus, and in which system a busy state of said resource or a conflict of consistency, which are signalled with a RETRY signal, compel said processor to execute a RETRY attempt for access to said resource with the presentation to said arbitration unit of another following access request BRi, the unit for arbitration comprising:

first logic means for correlating said RETRY signal with said processor which is to execute said RETRY attempt, and second logic means which, in response to a predetermined number N of consecutive RETRY attempts of said processor, said attempts being recognized through said RETRY signal and said first logic means, mask each successive and consecutive access requests BRi of said processor for a time internal varying with the number of further RETRY attempts of said processor consecutively following said predetermined number N of consecutive RETRY attempts.

2. Arbitration unit according to claim 1, in which said arbitration unit operates on the basis of arbitration cycles defined by a periodic clock and synchronization signal for said system and in which said second logic means, in response to said predetermined number N of consecutive RETRY attempts, mask each successive and consecutive access requests of said processor for a number of periods of said clock signal varying with the number of further RETRY attempts of said processor consecutively following said predetermined number N of consecutive RETRY attempts.

3. Arbitration unit according to claim 2, in which said busy state of said resource and said conflict of consistency are respectively signalled to said second logic means with a state retry signal S.RETRY and a response retry signal R.RETRY, which are different from one another and in which said predetermined number N is a first number for consecutive RETRY attempts set by said response retry signal R.RETRY and a second number for consecutive RETRY attempts set by one or the other of said state S.RETRY and response R.RETRY retry signals.

4. Arbitration unit according to claim 2 in which said varying number of clock signal periods increases with the number of said consecutive RETRY attempts consecutively following said predetermined number N of consecutive RETRY attempts, up to a number N+K of consecutive RETRY attempts and while N+K takes a predetermined value.

5. Arbitration unit according to claim 4 comprising a generator of pseudo random numbers which is connected to said second logic means and in which, after a number of said consecutive RETRY attempts greater than N+K, said varying number of clock signal periods is equal to a pseudo casual number generated by said generator.

6. Arbitration unit according to claim 5 in which said generator of pseudo random numbers comprises a cyclic counter activated by said clock signal.

7. Arbitration unit according to claim 1 in which said second logic means comprise a plurality of state machines, one for each of said processors; each of said state machines evolving from an initial state to successive active states, in response to each, except the last of consecutive RETRY attempts of one and the same processor from among said processors; each of said state machines passing from one of said active states to one of said states preceding said one active state in response to the last of said consecutive RETRY attempts; and if said preceding state is active, passing from said preceding state to said initial state in response to the execution, by the same processor, of an access operation which does not have to be reattempted.

* * * * *